(12) United States Patent
Chang et al.

(10) Patent No.: US 11,151,748 B2
(45) Date of Patent: Oct. 19, 2021

(54) 3D POINT CLOUD DATA ENCODING/DECODING METHOD AND APPARATUS

(71) Applicants: ELECTRONICS AND TELECOMMUNICATIONS RESEARCH INSTITUTE, Daejeon (KR); IUCF-HYU (INDUSTRY-UNIVERSITY COOPERATION FOUNDATION HANYANG UNIVERSITY), Seoul (KR)

(72) Inventors: Eun Young Chang, Daejeon (KR); Ji Hun Cha, Daejeon (KR); Su Gil Choi, Daejeon (KR); Euee Seon Jang, Seoul (KR); Min Ku Lee, Seoul (KR); You Sun Park, Seoul (KR)

(73) Assignees: Electronics and Telecommunications Research Institute, Daejeon (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 52 days.

(21) Appl. No.: 16/509,677

(22) Filed: Jul. 12, 2019

(65) Prior Publication Data

US 2020/0043199 A1  Feb. 6, 2020

(30) Foreign Application Priority Data

Jul. 13, 2018  (KR) .................. 10-2018-0081767
Jul. 12, 2019  (KR) .................. 10-2019-0084582

(51) Int. Cl.
*G06T 9/00* (2006.01)

(52) U.S. Cl.
CPC ..................................... *G06T 9/00* (2013.01)

(58) Field of Classification Search
CPC .......... G06T 9/00; G06T 9/001; G06T 17/00; H04N 19/186; H04N 19/124; H04N 19/136; H04N 19/182; H04N 19/70; H04N 19/44; H04N 19/46; H04N 19/176; H04N 19/597; H04N 19/85; H04N 19/184; H04N 19/30;

(Continued)

(56) References Cited

U.S. PATENT DOCUMENTS 5,808,621 A * 9/1998 Sundaresan ............... G06T 9/00
                                                    345/595
5,822,452 A * 10/1998 Tarolli .................. H04N 19/00
                                                    382/166

(Continued)

FOREIGN PATENT DOCUMENTS

KR   10-2014-0098094 A    8/2014
KR   10-2014-0133817 A   11/2014
KR   10-2015-0008070 A    1/2015

*Primary Examiner* — Michael S Osinski
(74) *Attorney, Agent, or Firm* — NSIP Law

(57) ABSTRACT

There is provided a method of decoding point cloud data, the method comprising: decoding a bitstream to obtain attribute information of point cloud data, acquiring attributes of the point cloud data using the decoded attribute information and reconstructing the point cloud data using the obtained attributes, wherein the attribute information contains bit depth information of each attribute of the point cloud data.

14 Claims, 13 Drawing Sheets

(58) Field of Classification Search
CPC .... H04N 19/117; H04N 19/132; H04N 19/14; H04N 19/159; H04N 19/463; H04N 19/98; H04N 9/77; H04N 13/161
See application file for complete search history.

(56) References Cited

U.S. PATENT DOCUMENTS

| | | | |
|---|---|---|---|
| 9,846,804 B2 | 12/2017 | Lim et al. | |
| 2006/0114987 A1* | 6/2006 | Roman | H04N 19/132 375/240.01 |
| 2011/0046923 A1 | 2/2011 | Lee et al. | |
| 2012/0281009 A1* | 11/2012 | Ward | H04N 5/2355 345/589 |
| 2013/0294689 A1* | 11/2013 | Jia | H04N 9/67 382/166 |
| 2014/0085537 A1* | 3/2014 | Chujoh | H04N 19/85 348/453 |
| 2014/0247869 A1* | 9/2014 | Su | H04N 19/124 375/240.03 |
| 2015/0195544 A1* | 7/2015 | Dev | H04N 19/136 375/240.26 |
| 2015/0319438 A1* | 11/2015 | Shima | H04N 19/186 375/240.03 |
| 2017/0006289 A1* | 1/2017 | Alshina | H04N 19/43 |
| 2017/0026646 A1* | 1/2017 | Minoo | H04N 19/117 |
| 2017/0085878 A1* | 3/2017 | Sole Rojals | H04N 19/18 |
| 2017/0085895 A1* | 3/2017 | Gu | H04N 19/46 |
| 2018/0315215 A1* | 11/2018 | Mroz | G16H 30/20 |
| 2018/0332286 A1* | 11/2018 | Pettersson | H04N 19/14 |
| 2019/0014298 A1* | 1/2019 | Ramasubramonian | H04N 19/132 |
| 2019/0014329 A1* | 1/2019 | Gao | H04N 19/186 |
| 2019/0149792 A1* | 5/2019 | Luo | H04N 9/76 348/571 |
| 2019/0164332 A1* | 5/2019 | Matsunobu | G06T 15/08 |
| 2019/0222623 A1* | 7/2019 | Huang | H04N 19/467 |
| 2020/0228777 A1* | 7/2020 | Dore | G06T 9/001 |
| 2020/0228836 A1* | 7/2020 | Schwarz | G06T 15/04 |
| 2020/0336762 A1* | 10/2020 | Lee | H04N 19/182 |
| 2020/0357439 A1* | 11/2020 | Akiyoshi | H04N 21/235 |
| 2020/0413040 A1* | 12/2020 | Lim | H04N 19/176 |
| 2020/0413069 A1* | 12/2020 | Lim | H04N 19/176 |
| 2021/0056730 A1* | 2/2021 | Ricard | G06T 9/00 |

* cited by examiner

FIG. 5

| attribute_header( *element* ) { | Descriptor |
|---|---|
|   if( *element* != "color" ) { | |
|     inputBitDepth[ *element* ] | u(8) |
|     bitDepth[ *element* ] | u(8) |
|     ect_flag [ *element* ] | u(8) |
|   } | |
|   numberOfNearestNeighborsInPrediction[ *element* ] | u(8) |
|   levelOfDetailCount[ *element* ] | u(8) |
|   for( lodIndex = 0; lodIndex < levelOfDetailCount; lodIndex++ ) { | |
|     samplingDistance2[ *element* ][ lodIndex ] | u(32) |
|   } | |
|   for( lodIndex = 0; lodIndex < levelOfDetailCount; lodIndex++ ) { | |
|     quantizationStep[*element*][ lodIndex ] | u(32) |
|   } | |
|   for( lodIndex = 0; lodIndex < levelOfDetailCount; lodIndex++ ) { | |
|     quantizationDeadZoneSize[ *element* ][ lodIndex ] | u(32) |
|   } | |
|   TransformType[ *element* ] | u(8) |
|   depthRAHT[ *element* ] | u(8) |
|   binaryLevelThresholdRAHT[ *element* ] | u(8) |
|   quantizationStepRAHT[ *element* ] | u(32) |
|   BitstreamSizeInBytes[ *element* ] | u(32) |
| } | |

FIG. 6

| attribute_bitstream( *element* ) { | Descriptor |
|---|---|
|   if( TransformType = = 1 ) { | |
|     RAHT_bitstream( *element* ) | |
|   } | |
|   else { | |
|     Lifting_bitstream( *element* ) | |
|   } | |
|   if( ect_flag = = 1 ) { | |
|     ectSize | u(32) |
|     ectElementBitDepth | u(32) |
|     ECT_bitstream( *element* ) | |
|   } | |
| } | |

FIG. 7

| ECT_bitstream( *element* ) { | Descriptor |
|---|---|
|   for( i = 0; i < ectSize; i++ ) { | |
|     signOfEctElement | u(1) |
|     ectValue[ *element* ][ i ] | u(n) |
|   } | |
| } | |

FIG. 8

- attribute header semantics
  inputBitDepth means bit depth of input attribute value.
  bitDepth means bit depth of compressed attribute value.
  ect_flag having a value of 1 indicates that attribute bitstream contains
  information on error correction table (ECT) and ect_flag having a value of 0
  indicates that attribute bitstream does not contain information on ECT.

- attribute bitstream semantics
  ectSize means a total number of ECT values.
  ectElementBitDepth means possible bit depth of ECT value.
  SignOfEctElement means the sign of each ECT value.
  ectValue means the absolute value of each ECT value.

FIG. 9

| Sequence | № input points | Reference | | | Proposed | | |
|---|---|---|---|---|---|---|---|
| | | Bits per input point [bpp] | Encoded size [bits] | Reflectance PSNR [dB] | Bits per input point [bpp] | Encoded size [bits] | Reflectance PSNR [dB] |
| citytunnel_q1mm | 19948121 | 8.61 | 171672112 | 76.16 | 5.03 | 100385552 | inf |
| | 19948121 | 4.07 | 81190408 | 50.98 | 4.02 | 80193472 | 54.24 |
| tollbooth_q1mm | 7148516 | 8.99 | 64267112 | 75.80 | 5.52 | 39428984 | inf |
| | 7148516 | 4.20 | 30015520 | 48.16 | 4.47 | 31928952 | 54.30 |

3D POINT CLOUD DATA ENCODING/DECODING METHOD AND APPARATUS

CROSS REFERENCE TO RELATED APPLICATION

The present application claims priority to Korean Patent Application Nos. 10-2018-0081767 filed Jul. 13, 2018 and 10-2019-0084582 filed Jul. 12, 2019, the entire contents of which is incorporated herein for all purposes by this reference.

BACKGROUND OF THE A

1. Field of the Invention

The present invention relates to a method and apparatus for encoding/decoding point cloud data. Specifically, the present invention relates to a method and apparatus for encoding/decoding attribute information in 3D point cloud data.

2. Description of the Related Art 3D point cloud data consists of position information (i.e., a set of coordinates) indicating the location of each point and attribute information such as color, reflectivity, normal, and transparency associated with each point.

Conventionally, when attribute information of 3D point cloud data is encoded/decoded, fixed bit depth processing is performed on the attribute information. For example, when encoding/decoding is performed on reflectivity which is one of the attributes, the encoding/decoding is performed on 16-bit reflectivity values. Therefore, when a reflectivity value consists of less than 16 bits or needs to be compressed into a value expressed in less than 16 bits, encoding/decoding performance is deteriorated.

In addition, conventional encoding/decoding methods do not perform error correction on attribute information compressed through near-lossless/lossy compression. Attribute information typically undergoes quantization for compression and dequantization for reconstruction. The resulting reconstructed attribute information is likely to have errors due to losses that occur during the quantization and dequantization. Therefore, the conventional encoding/decoding has a problem of generating errors in the reconstructed attribute information because error correction is not performed.

SUMMARY OF THE INVENTION

Accordingly, the present invention has been made keeping in mind the above problems occurring in the prior art.

An object of the present invention is to provide a method and apparatus for encoding/decoding attribute information of 3D point cloud.

Another object of the present invention is to provide a recording medium in which a bitstream produced by the encoding/decoding method or apparatus is stored.

According to the present invention, an object of the present invention is to provide a method and apparatus for encoding/decoding attribute information of 3D point cloud.

Moreover, according to the present invention, another object of the present invention is to provide a recording medium in which a bitstream produced by the encoding/decoding method or apparatus is stored.

According to the present invention, there is provided a method of decoding point cloud data, the method comprising: decoding a bitstream to obtain attribute information of point cloud data; acquiring attributes of the point cloud data using the decoded attribute information; and reconstructing the point cloud data using the obtained attributes, wherein the attribute information contains bit depth information of each attribute of the point cloud data.

According to one embodiment, the bit depth information is signaled in a sequence parameter set.

According to one embodiment, the attributes of the point cloud data are obtained by performing a clipping operation according to the bit depth information.

According to one embodiment, the acquiring of the attributes of the point cloud data comprises transforming a bit depth of each attribute from the point cloud data using the bit depth information.

According to one embodiment, the acquiring of the attributes from the point cloud data comprises: generating an error correction table; and acquiring the attributes of the point cloud data using the error correction table.

According to one embodiment, the generating of the error correction table comprises: constructing the first column of the error correction table on the basis of bit-depth-changed attributes of the point cloud data; and constructing the second column of the error correction table by decoding the bitstream.

According to one embodiment, the constructing of the first column of the error correction table comprises: reconstructing bit-depth-changed attribute values of the point cloud data; removing duplicate values among the reconstructed attribute values of the point cloud data; and constructing the first column of the error correction table by sorting the remaining attribute values resulting from the removing of the duplicate values.

According to one embodiment, the acquiring of the attributes of the point cloud data using the error correction table comprises reconstructing the attributes of the point cloud data using information in the first column and information in the second column of the error correction table.

Also, according to the present invention, there is provided a method of encoding 3D point cloud data, the method comprising: receiving an attribute of point cloud data; encoding an attribute of the point cloud data using information on the attribute of the point cloud data; and inserting the information on the attribute of the point cloud data into a bitstream, wherein the information on the attribute includes bit depth information of the attribute of the point cloud data.

According to one embodiment, the bit depth information is signaled in a sequence parameter set.

According to one embodiment, the encoding of the attribute of the point cloud data comprises transforming a bit depth of the attribute of the point cloud data by using the bit depth information.

According to one embodiment, the encoding of the attribute of the point cloud data comprises: generating an error correction table; and encoding the attribute of the point cloud data using the error correction table.

According to one embodiment, the generating of the error correction table comprises: constructing the first column of the error correction table on the basis of a bit-depth-changed attribute of the point cloud data; and constructing the second column of the error correction table on the basis of the attribute of the point cloud data and the bit-depth-changed attribute of the point cloud data.

According to one embodiment, the constructing of the first column of the error correction table comprises: reconstructing the bit-depth-changed attributes value of the point cloud data; removing duplicate values among the reconstructed attribute values of the point cloud data; and constructing the first column of the error correction table by sorting the remaining attribute values resulting from the removing of the duplicate values.

Also, according to the present invention, there is provided an apparatus for decoding 3D point cloud data, the apparatus comprising: an inverse transform module; and a reconstruction module, wherein the inverse transform module decodes a bitstream to obtain information on an attribute of point cloud data, the reconstruction module acquires the attribute of the point cloud data using the information on the decoded attribute of the point cloud data and reconstructs the point cloud data using the obtained attribute, and the information on the attribute includes bit depth information of the attribute of the point cloud data.

According to one embodiment, the bit depth information is signaled in a sequence parameter set.

According to one embodiment, the attribute of the point cloud data is obtained by performing a clipping operation on the basis of the bit depth information.

According to one embodiment, the inverse transform module transforms a bit depth of the attribute of the point cloud data using the bit depth information.

According to one embodiment, the apparatus further comprises a table generation module, wherein the table generation module generates an error correction table and acquires an attribute of the point cloud data using the error correction table.

Also, according to the present invention, there is provided a computer-readable non-transitory recording medium in which data that is received by and decoded in a point cloud data decoding apparatus so as to be used for reconstruction of point cloud data is stored, wherein the data includes information on attributes of the point cloud data, the decoded information on the attributes is used to acquire the attributes of the point cloud data, the acquired attributes are used to decode the point cloud data, and the information on the attributes includes bit depth information of the attributes of the point cloud data.

According to the present invention, it is possible to improve encoding/decoding efficiency for attribute information of 3D point cloud.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which:

FIGS. 5 through 8 are diagrams illustrating syntax element information required for implementation of a 3D point cloud attribute information encoding/decoding method and apparatus in an encoder/decoder according to one embodiment of the present invention, semantics of the syntax element information, and an encoding/decoding process.

FIG. 9 is a view illustrating the comparison results between operation of an encoding/decoding method and apparatus for 3D point cloud attribute information according to one embodiment of the present invention and operation of a conventional encoding/decoding method and apparatus;

DESCRIPTION OF THE PREFERRED EMBODIMENTS

Figure 1A:
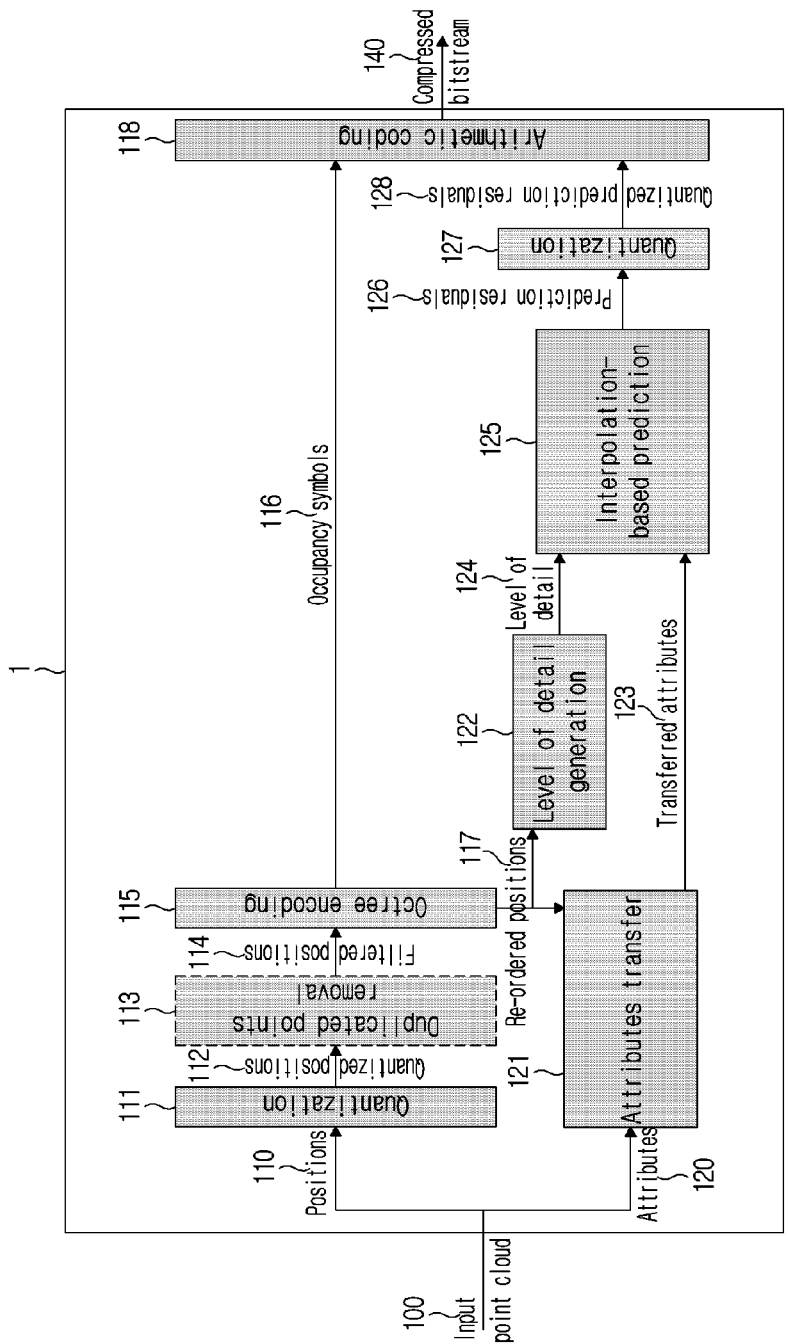
FIG. 1A is a block diagram illustrating operation of a conventional encoder.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component.

The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

FIG. 1A is a block diagram illustrating operation of a conventional encoder.

FIG. 1A may be an encoder belonging to PCC category 1 or 3.

Point cloud data to be described below in the present disclosure may mean 3D point cloud data.

Referring to FIG. 1A, an encoder 1 may divide input point cloud data 100 into position information (i.e., coordinate information) 110 and attribute information 120, and separately encode/decode the position information 110 and the attribute information 120. The position information 110 may be compressed through a quantization module 111, a redundancy removal module 113 which is subsequent to the quantization module, an octree coding module 115, and/or an arithmetic coding module 118. The redundancy removal module 113 subsequent to the quantization module is an optional module which can be omitted as necessary.

On the other hand, the number of pieces of the attribute information 120 is equal to the number of pieces of the position information 110 before the attribute information and the position information are compressed. That is, the attribute information 120 and the position information 110 are in a one-to-one correspondence. When duplicate values are removed from among values resulting from the quantization by the redundancy removal module 113, the position information changes. For example, the number of pieces of the position information may be reduced. Therefore, an attribute conversion module 121 is used to reorganize the original attribute information 120 into new attribute information so that the new attribute information and the changed position information enter into a one-to-one correspondence. For example, the original attribute information 120 may be reorganized into the new attribute information by the attribute conversion module 121 so that the pieces of the new attribute information respectively correspond to the pieces of the position information which are reduced in number through the redundancy removal. The pieces of the position information are grouped into levels and arranged through a level-of-detail (LOD) generation module 122. The reconstructed attribute information 123 is compressed by an interpolation-based prediction module 125 according to a predetermined grouping or aligning order by the level-of-detail (LOD) generation module 122. The interpolation-based prediction module 125 calculates a predicted value for a current attribute by performing interpolation on previously compressed attribute values using a close correlation between adjacent attribute values and then calculates a difference value 126 between the current attribute value and the predicted attribute value. Next, the difference value 126 between the current attribute value and the predicted attribute value may be compressed by the quantization module 127 and the arithmetic coding module 118.

Figure 1B:
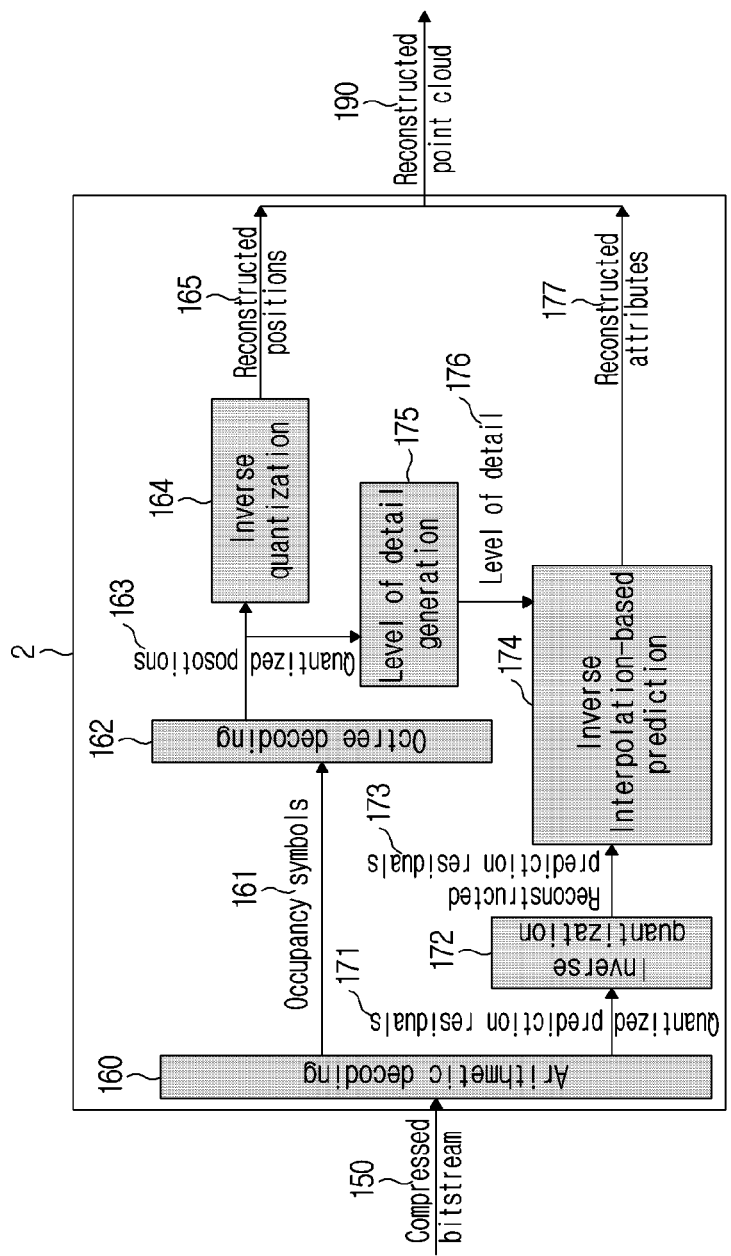
FIG. 1B is a block diagram illustrating operation of a conventional decoder.

FIG. 1B is a block diagram illustrating operation of a conventional decoder.

FIG. 1B may be a decoder in PCC categories 1 and 3. Referring to FIG. 1B, a decoder 2 decodes a compressed bitstream 150 that is input, using an arithmetic decoding module 160, thereby generating compressed position information 161 and compressed attribute information 171. The decoder 2 performs octree decoding 162 and dequantization 164 on the compressed position information 161, thereby obtaining reconstructed position information 165. The decoder 2 performs dequantization 172 on the compressed attribute information 171, performs inverse interpolation-based prediction 174 on the resulting values according to grouped levels and an aligned order by performing level-of-detail (LOD) generation 175 to obtain reconstructed attribute information 177, and The reconstructed point cloud data 190 is obtained by merging the reconstructed position information 165 and the reconstructed attribute information 177.

Figure 2A:
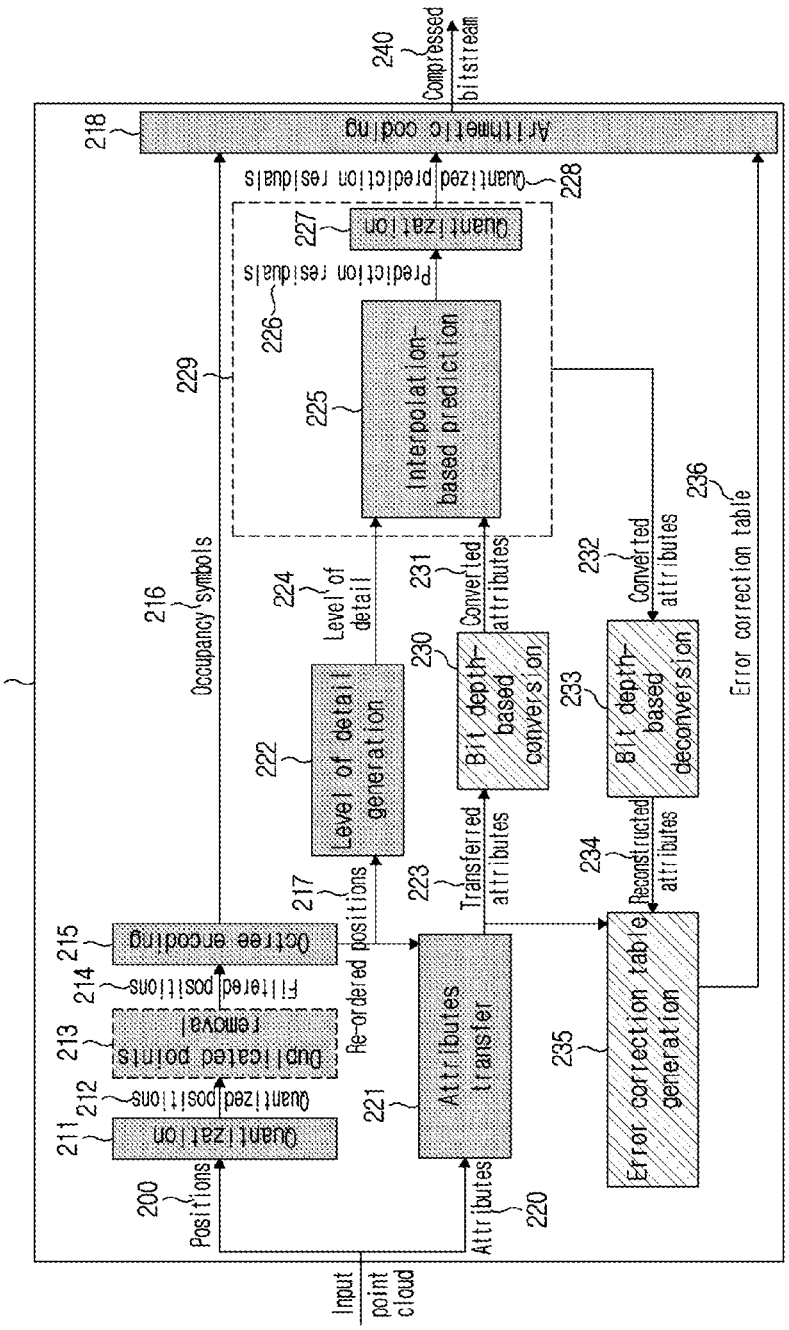
FIG. 2A is a block diagram illustrating operation of an encoder according to an embodiment of the present invention.

FIG. 2A is a block diagram illustrating operation of an encoder according to one embodiment of the present invention.

Figure 2B:
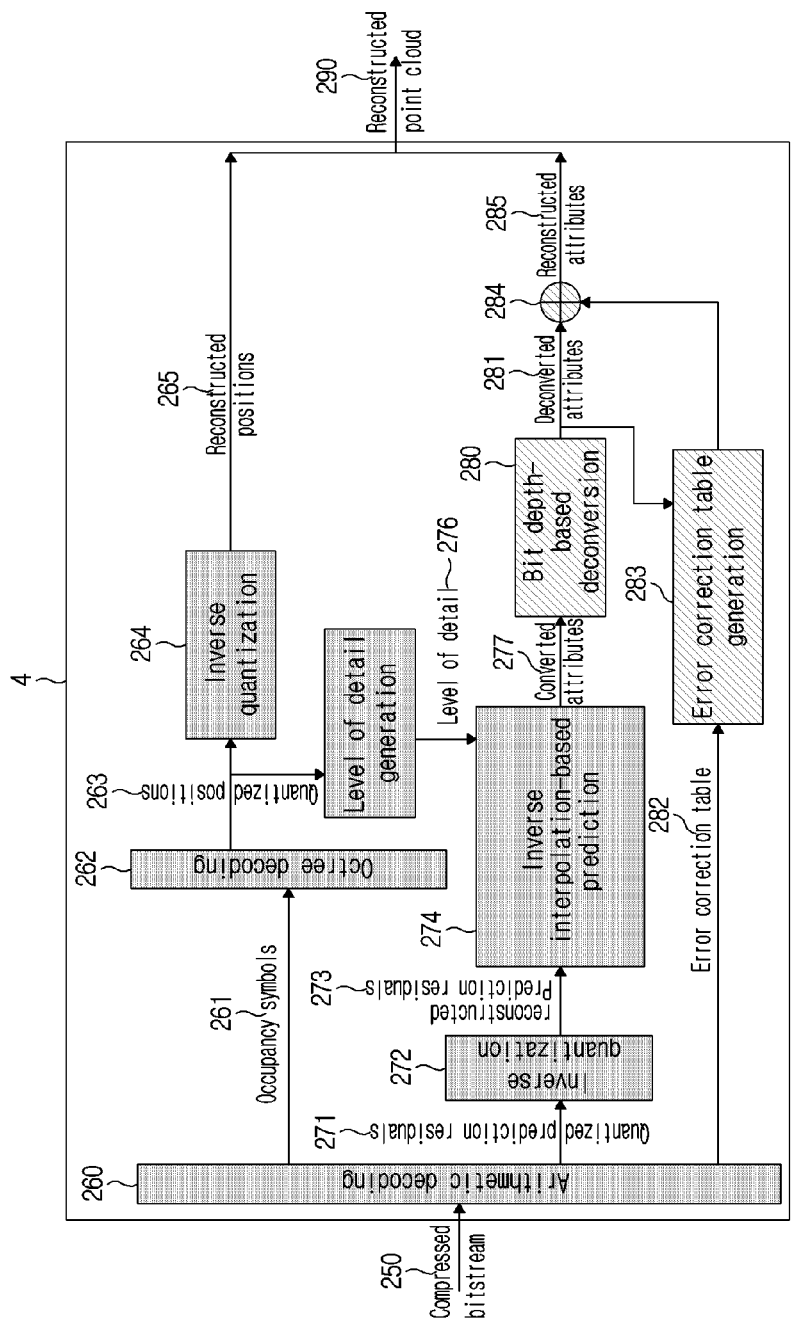
FIG. 2B is a block diagram illustrating operation of a decoder according to an embodiment of the present invention.

FIG. 2B is a block diagram illustrating operation of a decoder according to one embodiment of the present invention.

Referring to FIG. 2A, in comparison with the encoder 1 of FIG. 1A, the encoder 3 of FIG. 2A additionally includes a bit depth-based transform module 230, a bit depth-based inverse transform module 233, and/or a table generation module 235 used for attribute information coding.

The bit depth-based transform module 230 may transform input attribute information into fixed bit depth attribute information having a predetermined bit depth. The information on the predetermined bit depth may be signaled from the encoder to the decoder. Alternatively, the information on the predetermined bit depth may be derived from a value preset in the encoder/decoder. The information on the predetermined bit depth may be signaled in a sequence parameter set.

For example, the bit depth-based transform module 230 may perform transformation using Expression 1. That is, a shift operation may be performed on the input attributes by the transform module.

$$\dot{a}_n = a_n/2^{(i-d)} \quad \text{[Expression 1]}$$

In Expression 1, $a_n$ is an input attribute value, and $\dot{a}_n$ is a transformed attribute value. In addition, n is an index depending on the number of points. For example, when the point cloud data contain 10,000 entries, each index have a value within a range of from 0 to 9,999. In addition, represents an input bit depth, and d represents a fixed bit depth (i.e., predetermined bit depth). For example, when the input attribute is a 16-bit value in the range of from 0 to 65,535 and the fixed bit depth d is 8, the transform on the input attribute information is performed by dividing by 256 $(=2^{(16-8)})$ On the other hand, when the fixed bit depth is 10, the transform on the input attribute value is performed by dividing by 64 $(=2^{(16-10)})$.

The bit depth-based inverse transform module 233 performs inverse transform on the fixed bit depth attribute information to obtain the original bit depth attribute information (i.e., input bit depth attribute information). For example, the bit depth-based inverse transform module 233 may perform inverse transform using Expression 2. That is, the attribute information may be obtained by performing a shift operation.

$$\ddot{a}_n = \dot{a} \times 2^{(i-d)} \quad \text{[Expression 2]}$$

In Expression 2, $\dot{a}_n$ is a fixed bit depth attribute value (i.e. bit depth-converted attribute value), and $\ddot{a}_n$ is an attribute value represented with original bit depth generated through inverse transformation. In addition, n is an index depending on to the number of points. In addition, i is an original bit depth and d is a fixed bit depth (predetermined bit depth).

The table generation module 235 generates a table used for correction of the reconstructed attribute values that have undergone near-lossless or lossy compression such that the reconstructed attribute values become closer to the original attribute values, on the basis of the fixed bit depth, because the reconstructed attribute values are likely to differ from the respective original attribute values. Here, the reconstructed attribute values generated from the near-lossless/lossy compression may be obtained by performing a first process 229 involving a bit depth-based transform module 230, an interpolation-based prediction module 225, and/or a quantization module 227, and a bit depth-based inverse transform module 233. Since the first process 229 involves the dequantization module 272 and the inverse interpolation-based prediction module 274 included in the decoder 4, the encoder 3 according to the present disclosure can obtain the same attribute information as the reconstructed attribute information generated by the decoder 4.

Figure 3:
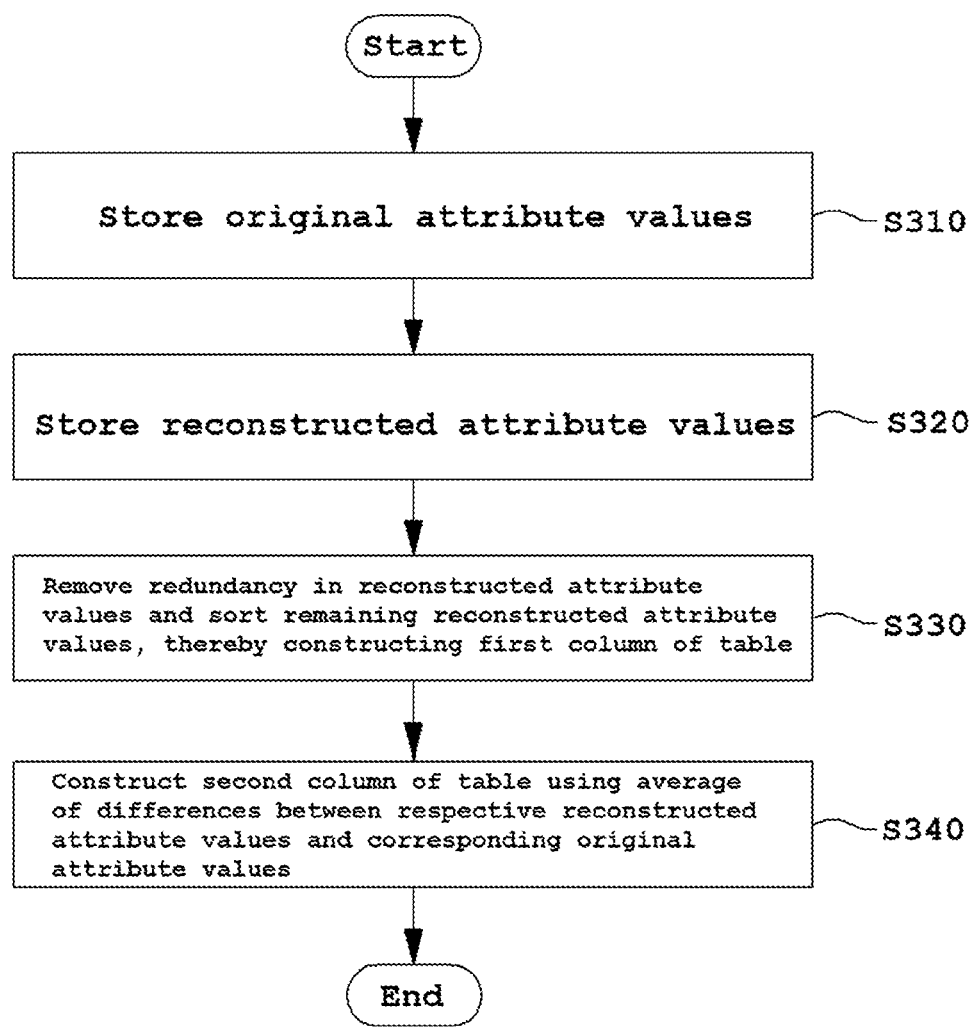
FIG. 3 is a flowchart illustrating a process of generating an error correction table in an encoder according to an embodiment of the present invention.

FIG. 3 is a flowchart illustrating a process of generating a table in an encoder according to an embodiment of the present invention.

The operation of the encoder illustrated in FIG. 3 may be performed by a table generation module included in the encoder.

Referring to FIGS. 2A and 3, in step S310, the encoder may store original attribute values inputted to the bit depth-based transform module 230.

In step S320, the encoder may store the reconstructed attribute values generated by the first process 229 and the bit depth-based inverse transform module 233.

In step S330, the encoder may eliminate duplicate values among the reconstructed attribute values and then construct the first column of the table by sorting the remaining values resulting from the removal of duplicate values (i.e., redundancy removal), in ascending order. Alternatively, the remaining values may be sorted in descending order.

In step S340, the encoder may construct the second column of the table with the average value of the differences between the respective reconstructed attribute values and the corresponding original attribute values.

The first column of the two columns of the table constructed in the encoder is information that can be reconstructed in the decoder. Therefore, the table information of the first column may not be transmitted to the decoder, and only the table information 236 of the second column may be transmitted to the decoder.

Referring back to FIG. 2B, as compared with the decoder of FIG. 1B, the decoder 4 of FIG. 2B additionally includes a bit depth-based inverse transform module 280, a table generation module 283, and/or a correction module 284 for correcting bit depth-based inverse transformed attribute information 281 such that the reconstructed attribute information become closer to the original attribute information.

The bit depth-based inverse transform module 280 may perform inverse transform on the predetermined bit depth attribute information using Expression 2, thereby obtaining the attribute information represented with original bit depth.

The information of the predetermined bit depth may be signaled from the encoder to the decoder. Alternatively, the information of the predetermined bit depth may be derived from a preset value in the encoder/decoder. When being signaled, the information of the predetermined bit depth may be signaled in a sequence parameter set (SPS). The attribute information may be obtained first by performing a shift operation on the predetermined bit depth to obtain an upper limit value of the attribute information and then by performing a clipping operation based on the upper limit value of the attribute information. For the attribute information, it is possible to find an effective value range on the basis of the predetermined bit depth. Therefore, when the value of the attribute is beyond the effective value range, the value of the attribute is corrected.

Figure 4:
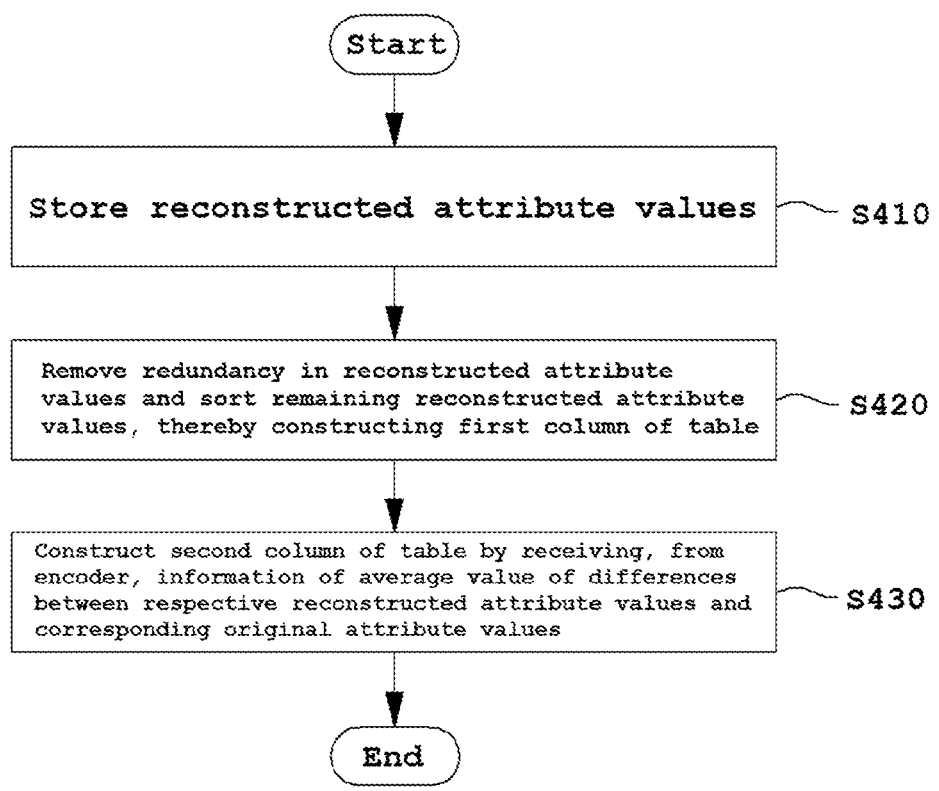
FIG. 4 is a flowchart illustrating a process of generating an error correction table in a decoder according to an embodiment of the present invention.

FIG. 4 is a flowchart illustrating a process of generating a table in a decoder according to an embodiment of the present invention.

The operation of the decoder described below with reference to FIG. 4 may be performed by a table generation module included in the decoder.

Referring to FIGS. 2B and 4, in step S410, the decoder may store the reconstructed attribute values having the original bit depth obtained by using the bit depth-based inverse transform module 280.

In step S420, the decoder constructs the first column of the table by eliminating duplicate values among the reconstructed attribute values and sorting the remaining reconstructed values in ascending order. Alternatively, the remaining values may be sorted in descending order.

In step S430, the decoder constructs the second column of the table using the average value of differences between the reconstructed attribute values and the corresponding original attribute values. The decoder may receive the information from the encoder.

The decoder may obtain inverse transformed attribute information 281 using the bit depth-based inverse transform module 280. In addition, the decoder may obtain the first and second columns of the table using the table generation module 283. The decoder may finally restore the attribute information by performing a correction process of adding the inverse transformed attribute information 281 and the corresponding value in the second column. The correction process may be performed by the correction module 284.

FIGS. 5 to 8 are diagrams illustrating syntax element information required for implementing a 3D point cloud attribute information encoding/decoding method in an encoder/decoder, semantics of the syntax element information, and an encoding/decoding process.

Referring to FIGS. 5 to 8, as compared with a conventional encoding/decoding process for compressing attribute information of 3D point cloud, syntax elements such as inputBitDepth, bitDepth, ect_flag, ectSize, ectElementBitDepth, signOfEctElement, and ectValue are added. On the other hand, the name of each syntax element is an example, and may vary depending on embodiments.

FIG. 9 is a diagram illustrating the comparison results between operation of a 3D point cloud attribute information encoding/decoding method and apparatus according to one embodiment of the present invention and operation of a conventional encoding/decoding method and apparatus.

For comparison between the two methods, two different test sequences, citytunnel_q1mm and tollbooth_q1mm, each containing a 16-bit reflectivity value were used.

In FIG. 9, "Sequence" means the name of a test sequence, "No input inputs" means the number of point clouds included in each test sequence, "Reference" means a result obtained by performing a conventional encoding/decoding method, "Proposed" and is a result obtained by performing an encoding/decoding method according to the present disclosure. For example, the conventional encoding/decoding method may be a reference software belonging to MPEG PCC Test Model Category 1 or 3. The encoding/decoding method according to the present disclosure is an addition of the components described above with reference FIGS. 2A to 8 to the MPEG PCC Test Model Category 1,3 reference software.

In addition, "Encoded size" means a compression result of reflectivity attribute information. For example, in the case of a citytunnel_q1mm test sequence, when the encoded size is 171,672,112 bits, the amount of information of the reflectivity attribute that is included in the test sequence prior to the compression is the product (i.e., 319,169,936 bits) of 19,948,121 times 16 bits. Accordingly, the conventional encoding/decoding method exhibits a compression ratio of about 54% (171672112 divided by 319169936 is about 0.54). In addition, "Bits per input point (bpp)" means the number of bits per point in a compressed state. For example, in the case of citytunnel_q1mm test sequence, when the encoded size is 171,672,112 bits, the bpp is 8.61 (i.e., 171672112 divided by 19,948,121 is 8.61). That is, attribute information has a size of 16 bits per point before compression, and the size is reduced to 8.61 bpp after compression. In addition, "Reflectance PSNR" means a difference between a test sequence that is original and a reconstructed sequence that is generated through compression and reconstruction in the encoder and the decoder. As the PSNR is increased, the difference between the original data and the reconstructed data is decreased. That is, the larger the PSNR is, the more similar the original sequence and the reconstructed sequence is.

Referring to FIG. 9, the encoding/decoding method according to the present disclosure exhibits an improved compression ratio and PSNR for attribute information in comparison with the conventional compression method. The encoding/decoding method according to the present disclosure can use bit depth information of attribute information and compensate for errors in the near-lossless/lossy compressed attribute information.

For example, in the case of the conventional encoding/decoding method, the PSNR was 76.16 dB when the attributes were compressed to 8.61 bpp. However, in the case of the encoding/decoding method according to the present disclosure, when the compression ratio was 5.03 bpp, which is higher than that of the conventional encoding/decoding method, the PSNR was infinity (inf). Here, "inf" may mean that the original sequence which has not undergone compression and the reconstructed sequence that has undergone compression are perfectly identical to each other. In the case of the conventional encoding/decoding method, the PSNR was 50.98 dB when the attributes were compressed to 4.07 bpp. However, in the case of the encoding/decoding method according to the present disclosure, the PSNR was 54.24 when the attributes were compressed to 4.02 bpp, which is higher than that of the conventional encoding/decoding method.

Figure 10:
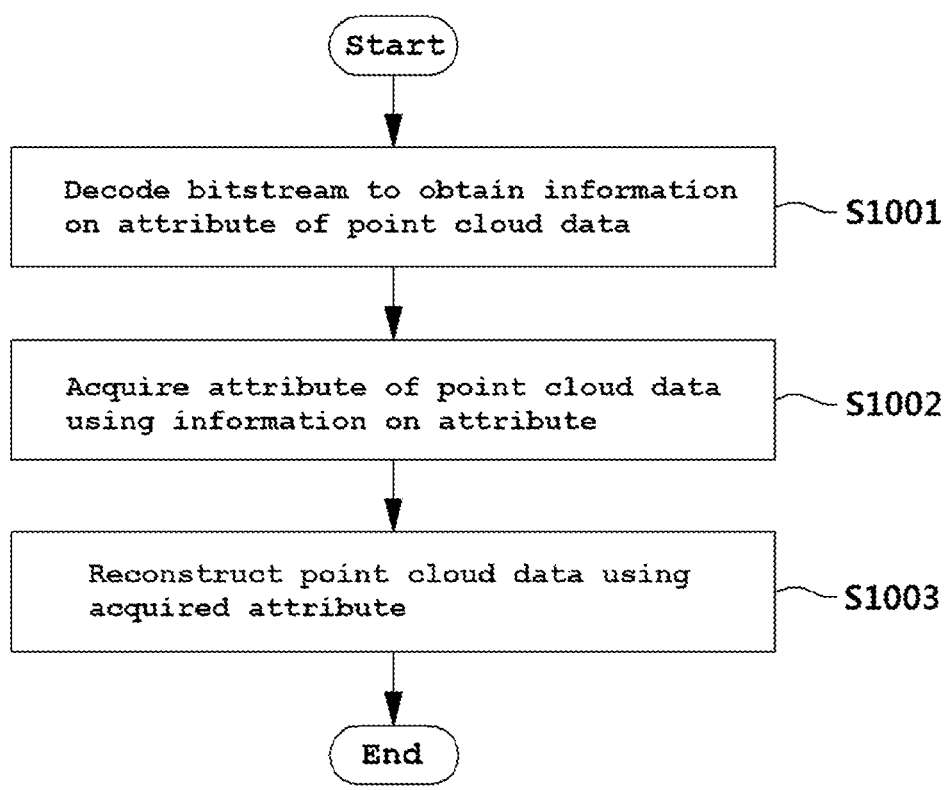
FIG. 10 is a flowchart of a point cloud data decoding method according to an embodiment of the present invention.

FIG. 10 is a flowchart illustrating a point cloud data decoding method according to one embodiment of the present invention.

In step S1001, a bitstream is decoded to obtain information on attributes of point cloud data.

The information on the attributes may include bit depth information of the attributes of the point cloud data.

Here, the bit depth information may be signaled in a sequence parameter set.

In step S1002, attributes of the point cloud data are acquired using the decoded information on the attributes.

The attributes of the point cloud can be acquired by performing a clipping operation based on the bit depth information.

The acquiring of the attributes of the point cloud data may include transforming the bit depths of the attributes of the point cloud data using the bit depth information.

On the other hand, the acquiring of the attributes of the point cloud data may include generating an error correction table and acquiring the attributes of the point cloud data using the error correction table.

The generating of the error correction table may include constructing the first column of the error correction table on the basis of the bit-depth-converted attributes of the point cloud data and constructing the second column of the error correction table by decoding the bitstream.

On the other hand, the constructing of the first column of the error correction table may include reconstructing the bit depth-converted attribute values of the point cloud data, removing redundancy in the reconstructed attribute values of the reconstructed point cloud data, and sorting the remaining reconstructed attribute values resulting from the redundancy removal.

On the other hand, the acquiring of the attributes of the point cloud data using the error correction table may include reconstructing the attributes of the point cloud data using the information in the first column and the information in the second column of the error correction table.

In step S1003, the point cloud data may be reconstructed using the acquired attribute.

Figure 11:
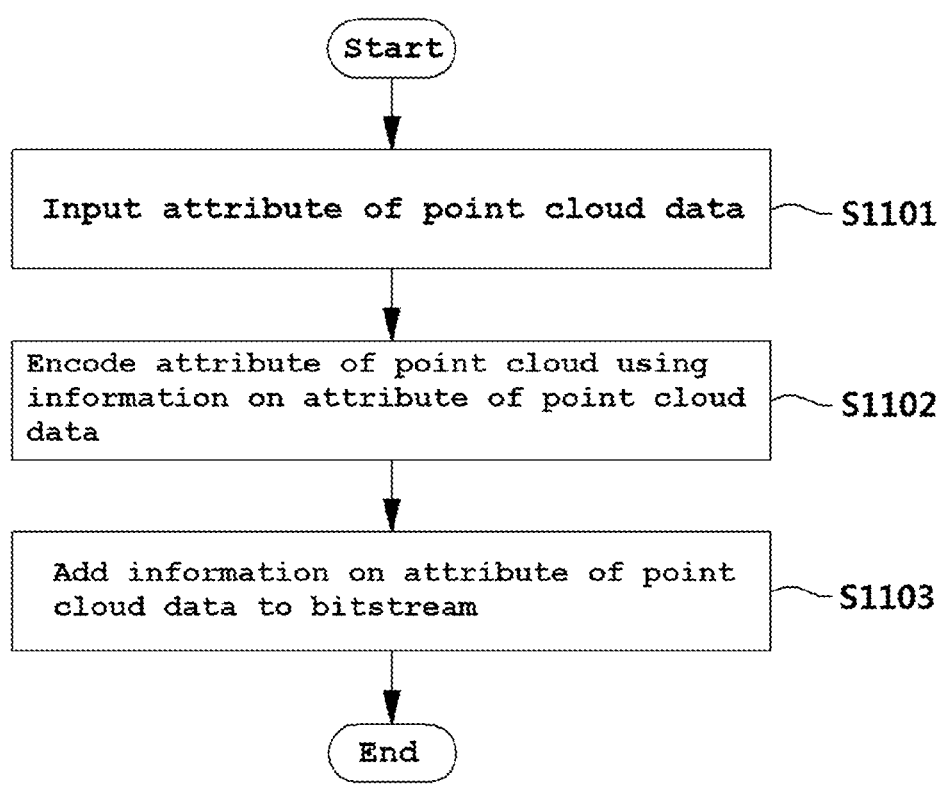
FIG. 11 is a flowchart of a point cloud data encoding method according to an embodiment of the present invention.

FIG. 11 is a flowchart of a point cloud data encoding method according to an embodiment of the present invention.

In step S1101, attributes of point cloud data may be inputted.

Information on the attributes include bit depth information of the attributes contained in the point cloud data.

Here, the bit depth information may be signaled in a sequence parameter set.

In step S1102, the attributes of the point cloud data may be encoded using the information on the attributes of the point cloud data.

The encoding of the attributes of the point cloud data may include transforming the bit depths of the attributes of the point cloud data using the bit depth information.

The encoding of the attributes of the point cloud data may include generating an error correction table and encoding the attributes of the point cloud data using the error correction table.

On the other hand, the generating of the error correction table may include constructing the first column of the error correction table on the basis of the bit depth-converted attributes of the point cloud data and constructing the second column of the error correction table on the basis of the attributes of the point cloud data and the bit depth-converted attributes of the point cloud data.

On the other hand, the constructing the first column of the error correction table may include reconstructing the bit depth-converted attribute values of the point cloud data, removing redundancy in the reconstructed attribute values of the point cloud data, and sorting the remaining reconstructed attribute values resulting from the redundancy removal.

According to the present invention, method and apparatus for encoding/decoding 3D point cloud attribute information are provided.

According to the present invention, a recording medium in which a bitstream generated by the encoding/decoding method or apparatus according to the present invention is stored is provided.

According to the present invention, it is possible to improve encoding/decoding efficiency for attribute information of 3D point cloud.

According to the present invention, it is possible to improve compression performance by using bit depth information of attribute information. For example, a 16-bit attribute may have a value in the range of 0 to 65,535. That is, there may be 65,536 pieces of bit depth information. In this case, when a certain attribute actually has a value that can be expressed in less than 16 bits, specifically, when only 256 values among the 65,536 ranging from 0 to 65,535 are actually used, the bit depth of the attribute information is changed into 8 bits, which has an effect of reducing the number of bits of a bitstream generated through compression.

Further, according to the present invention, an error of near-lossless/lossy compressed attribute information can be corrected. the reconstructed values of the attribute information that has undergone the near lossless/lossy compression based on the bit depth information are likely to differ from the original values of the attribute information.

The correction may be performed as described below. The encoder obtains compressed and reconstructed attribute values corresponding to input original attribute values. The encoder removes redundancy in the reconstructed attribute values to construct the first column of a table. The encoder constructs the second column of the table by averaging the differences between the reconstructed attribute values in the first column and the corresponding original attribute values. The encoder transmits information on the second column to the decoder. The decoder acquires the reconstructed attributes, removes redundancy, and constructs the first column. The decoder constructs the second column using the average differences between the original attribute values and the respective reconstructed attribute values received from the encoder. The decoder corrects errors of attributes by adding the inverse transformed attribute information and the average value in the prepared table.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method of decoding three-dimensional point cloud data, the method comprising:
   decoding a bitstream to obtain attribute information of the three-dimensional point cloud data;
   acquiring attributes of the three-dimensional point cloud data using the decoded attribute information; and
   reconstructing the three-dimensional point cloud data using the obtained attributes,
   wherein the attribute information is bit depth information of transparency, reflection, and normal of the three-dimensional point cloud data.

2. The method according to claim 1, wherein the bit depth information is signaled in a sequence parameter set.

3. The method according to claim 1, wherein the attributes of the three-dimensional point cloud data are obtained by performing a clipping operation according to the bit depth information.

4. The method according to claim 1, wherein the acquiring of the attributes of the three-dimensional point cloud data comprises transforming a bit depth of each attribute from the three-dimensional point cloud data using the bit depth information.

5. The method according to claim 4, wherein the acquiring of the attributes from the three-dimensional point cloud data comprises:
   generating an error correction table; and
   acquiring the attributes of the three-dimensional point cloud data using the error correction table.

6. The method according to claim 5, wherein the generating of the error correction table comprises:
   constructing the first column of the error correction table on the basis of bit-depth-converted attributes of the three-dimensional point cloud data; and
   constructing the second column of the error correction table by decoding the bitstream.

7. The method according to claim 6, wherein the constructing of the first column of the error correction table comprises:
   reconstructing bit-depth-converted attribute values of the three-dimensional point cloud data;
   removing duplicate values among the reconstructed attribute values of the three-dimensional point cloud data; and
   constructing the first column of the error correction table by sorting the remaining attribute values resulting from the removing of the duplicate values.

8. The method according to 6, wherein the acquiring of the attributes of the three-dimensional point cloud data using the error correction table comprises reconstructing the attributes of the three-dimensional point cloud data using information in the first column and information in the second column of the error correction table.

9. An apparatus for decoding three-dimensional point cloud data, the apparatus comprising:
   an inverse transform module; and
   a reconstruction module,
   wherein the inverse transform module decodes a bitstream to obtain information on an attribute of the three-dimensional point cloud data,
   the reconstruction module acquires the attribute of the three-dimensional point cloud data using the information on the attribute of the three-dimensional point cloud data and reconstructs the three-dimensional point cloud data using the obtained attribute, and
   the information on the attribute is bit depth information of transparency, reflection, and normal of the three-dimensional point cloud data.

10. The apparatus according to claim 9, wherein the bit depth information is signaled in a sequence parameter set.

11. The apparatus according to claim 9, wherein the attribute of the three-dimensional point cloud data is obtained by performing a clipping operation on the basis of the bit depth information.

12. The apparatus according to claim 9, wherein the inverse transform module transforms a bit depth of the attribute of the three-dimensional point cloud data using the bit depth information.

13. The apparatus according to claim 12, further comprising a table generation module,
   wherein the table generation module generates an error correction table and acquires an attribute of the three-dimensional point cloud data using the error correction table.

14. A computer-readable non-transitory recording medium in which data that is received by and decoded in three-dimensional point cloud data decoding apparatus so as to be used for reconstruction of the three-dimensional point cloud data is stored,
   wherein the data includes information on an attribute of the three-dimensional point cloud data,
   the decoded information on the attribute is used to acquire the attribute of the three-dimensional point cloud data,
   the acquired attribute is used to reconstruct the three-dimensional point cloud data, and
   the information on the attribute is bit depth information of transparency, reflection, and normal of the three-dimensional point cloud data.

* * * * *